United States Patent [19]

Satava et al.

[11] 4,394,194
[45] Jul. 19, 1983

[54] METHOD FOR HEAT TREATING STRUCTURAL MEMBERS

[75] Inventors: George L. Satava, Arlington, Tex.; Carroll L. Deemer, Euclid, Ohio

[73] Assignee: Midland Steel Products, Cleveland, Ohio

[21] Appl. No.: 192,430

[22] Filed: Sep. 29, 1980

[51] Int. Cl.³ ............................................. C21D 1/18
[52] U.S. Cl. ................................... 148/131; 148/143; 148/144; 148/150; 148/153
[58] Field of Search ............... 148/131, 143, 144, 150, 148/153

[56] References Cited

U.S. PATENT DOCUMENTS

| | | | |
|---|---|---|---|
| 3,251,588 | 5/1966 | French | 266/117 |
| 3,252,695 | 5/1966 | Kuchera | 266/117 |
| 3,294,597 | 12/1966 | Kuchera | 148/131 |
| 3,352,724 | 11/1967 | McNitt et al. | 148/144 |
| 3,699,302 | 10/1972 | Griffith | 219/10.57 |
| 3,738,629 | 6/1973 | Coleman | 266/117 |
| 4,142,923 | 3/1979 | Satava | 148/131 |

OTHER PUBLICATIONS

Tom Allen, "Production of High Strength Quenched and Tempered ERW Tubular Products Utilizing Induction...", 13th Mechanical Working & Steel Processing Conf., Jan. 20, 1971, Pitts., Pa.
R. A. Grange, "The Rapid Heat Treatment of Steel", *Metallurgical Transactions*, vol. 2, Jan. 1971, pp. 65–78.
*Metals Handbook*, vol. 2, 8th Ed., "Induction and Flame Hardening", pp. 167–202.

*Primary Examiner*—R. Dean
*Attorney, Agent, or Firm*—Fay & Sharpe

[57] ABSTRACT

The present invention relates generally to an improved method and apparatus for induction heat treating and restraint quenching structural members of carbon steel, to a uniform martensitic structure, such that distortion of the member due to rapid quenching is controlled to a minimum. More specifically, the member is generally heated by induction in two stages generally to austenitizing temperature in the range of 1450° to 1750° F. Then the member is liquid quenched under restraint to below 1000° F. to minimize distortion and finally tempered under restraint at a temperature in the range of 750° to 1250° F. Such structural members attain minimum physical properties after heat treating in the range of 110,000 psi yield strength and 125,000 psi tensile strength.

22 Claims, 14 Drawing Figures

METHOD FOR HEAT TREATING STRUCTURAL MEMBERS

BACKGROUND OF THE INVENTION

The present invention generally relates to a method and apparatus for induction heat treating and restraint quenching of structural members generally having a web and at least one flange. The object of this heat treatment is to produce certain physical properties which are required in the design of truck side rails, as a means of increasing strength of a given side rail section such that the payload capability of a truck is increased while holding down the weight thus effecting a more energy efficient vehicle. Truck side rails are generally long structural channel members generally 18 to 40 feet in length, 0.210 to 0.375 inch thick. Due to the use of a carbon steel, a rapid effective quench is necessary to obtain the required minimum physical properties and microstructure. As the truck side rail is a long, thin section member, generally cold formed into its channel shape from a flat strip, considerable residual stresses are present due to the forming operation. During the heating and rapid quenching of these thin section members, considerable distortion occurs due to the interaction of the residual stresses and the severe thermal action of the quench; distortion is evident in the member as bow, twist, and camber, as well as growth experienced along the length and width of the side rail due to the material grain size enlargement and mechanical working as a result of the heat treat operation.

The present invention more specifically relates to a method and apparatus for induction heat treating and restraint quenching structural members such that the total system represents a more economical investment than do existing conventional methods of restraint quenching, in particular, restraint quenching truck side rails. These other techniques for restraint quenching truck side rails are taught in U.S. Pat. Nos. 3,252,695 and 3,294,597 in which are employed large movable die quench sections constructed with a vast network of quench fluid passages to simultaneously allow quench fluid passage and provide restraint, such that the overall effect is akin to a large forming press complete with dies, representing a sizeable investment. The method of restraint taught in conventional methods must be elaborate as the entire member is quenched at the same time, setting up significant thermal gradients along the member length, greatly increasing its propensity to distort. The present invention does not require the large quench press and its attendant special die sections as relatively short sections of the rail are heated in stages to austenitizing temperature and then immediately restraint quenched on a continuing basis as the member travels longitudinally through the system, necessitating only a relatively short restraint quench system which, in the present invention, employs special restraint rolls.

It is known generally to produce induction heated, quenched and tempered, high strength steels for tubular products but not necessarily for structural members, more specifically channel members. One method of making these is described by Tom Allan in a paper entitled "Production of High Strength Quenched and Tempered ERW Tubular Products Utilizing Induction Heating Equipment," 13th Mechanical Working and Steel Processing Conference, Jan. 20, 1971, Pittsburgh, Pa.

Generally others have taught various techniques for rapid heat treating of steel and quenching. Examples of this are R. A. Grange, "The Rapid Heat Treatment of Steel", *Metallurgical Transactions*, Vol. 2, January 1971, p. 65–78. More generally, the induction and flame hardening of metal is known as shown in the *Metals Handbook*, Vol. 2, 8th Edition, "Induction and Flame Hardening", pages 167–202. The particular type of hardening taught in this instance is known as "through hardening". Other developments of bar quenching fixtures are taught in U.S. Pat. No. 3,738,629. Various inductor coil designs are taught in U.S. Pat. No. 3,699,302 and in the *Metals Handbook*, Vol. 2, page 171.

None of these techniques have to date achieved significant commercial use because of the serious problems of bowing, twisting and cambering associated therewith or the significant capital investment necessary to achieve the high quality, high strength product called for by user specifications.

A more recent improvement in production heat treatment is U.S. Pat. No. 4,142,923 which teaches the use of inductor coil heating, liquid quenching under restraint and tempering under restraint generally. While this system reduces capital investment, problems with ability to control localized bowing and dislocation of holes subsequently punched in the structural member caused by cambering in the heat treat process have not been solved sufficiently to achieve the high quality high strength members on a continuous production basis.

Thus, it is apparent that improvements in the art are needed to provide a method and apparatus for heat treating structural members on a production basis while maintaining the distortions to within the user specifications for the product structural members.

SUMMARY OF THE INVENTION

It is therefore an object of the present invention to provide improvements in the method and apparatus for heat treating structural members on a production basis so as to minimize distortions within the structural member which may cause it to fail to meet the users' specifications for such structural members.

It is another object of the present invention to utilize concurrent restraint in the quenching process in the form of rolls so as to eliminate sinusoidal type localized bowing from occurring in the structural member.

It is still a further object of the present invention to significantly reduce cambering of the structural member which causes any holes that are punched therein to be dislocated by utilization of vertical rolls carefully placed within the tempering region of the apparatus and by means of careful control of advancement of the structural member through the apparatus.

These and other objects of the present invention, along with the advantages thereof over existing and prior art forms which will become apparent to those skilled in the art from the detailed disclosure of the present invention as set forth herein below, are accomplished by the improvements herein shown, described and claimed.

It has been found that a method for induction heat treating and quenching of a structural member of carbon steel to a uniform martensitic structure, said structural member having a web and at least one flange substantially perpendicular thereto can consist of: induction preheating the structural member to a temperature in the range of 900° to 1400° F. by means of at least one coil utilizing the frequency in the range of 180 to 3000 cycles continuing in a separate induction heating stage to heat the structural member to the austenitizing temperature in the range of 1450° to 1800° F. by the use of at least one coil having a higher frequency than that of the prior step; liquid quenching the structural member with a multiplicity of nozzles immediately, said nozzles being disposed at an angle in the direction of the advance of the structural member and pressure regulated particularly on the bottom of the structural member to minimize distortion thereof; concurrently restraining the member by its web in a series of rolls placed on the bottom and top thereof until the structural member has reached a temperature below 1000° F. to minimize localized bow distortion; induction heating the structural member to a tempering temperature in the range of 750° to 1250° F. by the use of at least one coil having a frequency in the range of 180 to 3000 cycles; and subsequently restraining the structural member while cooling to avoid distortion by passing the structural member through a set of roll forming stands.

DESCRIPTION OF THE PREFERRED EMBODIMENTS

The method and apparatus of the present invention is designed to the heat treatment of a generally low alloy steel such as a carbon steel using the special heat treat and restraint quenching operation to increase the physical properties and characteristics of the carbon steel so that it will perform effectively with weight savings for structural components particularly those designed for truck frames. Generally, it is contemplated that the method and apparatus of the present invention will typically be used on a carbon steel having a carbon content of 0.21 to 0.30%, manganese 1.00 to 1.50%, sulfer 0.05% maximum, phosphorous 0.04% maximum, such steels being known those skilled in the art as SAE 1025 and SAE 1027 modified. It is anticipated that the use of these materials with the apparatus and process of the present invention will yield minimum physical properties after the heat treatment in the area of 110,000 psi minimum yield strength and 125,000 psi minimum tensile strength. Furthermore, the hardness of this material after the completing of the tempering should be in the range of 269 to 331 Brinell. The method of the present invention can be utilized for the heat treatment of formed channel members which are characteristically utilized for the construction of truck frames although other shapes such as T, I-Beam, bars, flats, round and other various structural shapes could be heat treated in a similar fashion utilizing proper induction coils for the heating process portion of the method. The channel shaped structural members of particular interest to the present invention generally have an outside measurement in the range of $9\frac{1}{8}$ to $12\frac{1}{4}$ inches, with each leg of such channel members having a measurement in the range of 3 to 4 inches in which functional cutouts may be present and generally constructed of stock having a thickness up to $\frac{1}{2}$ inch, although more frequently in the range of 0.250 to 0.312 inch. Structural members in this size and shape description range are generally very useful in the construction of the structural portions of truck frames, particularly truck side frame rails.

Figure 1:
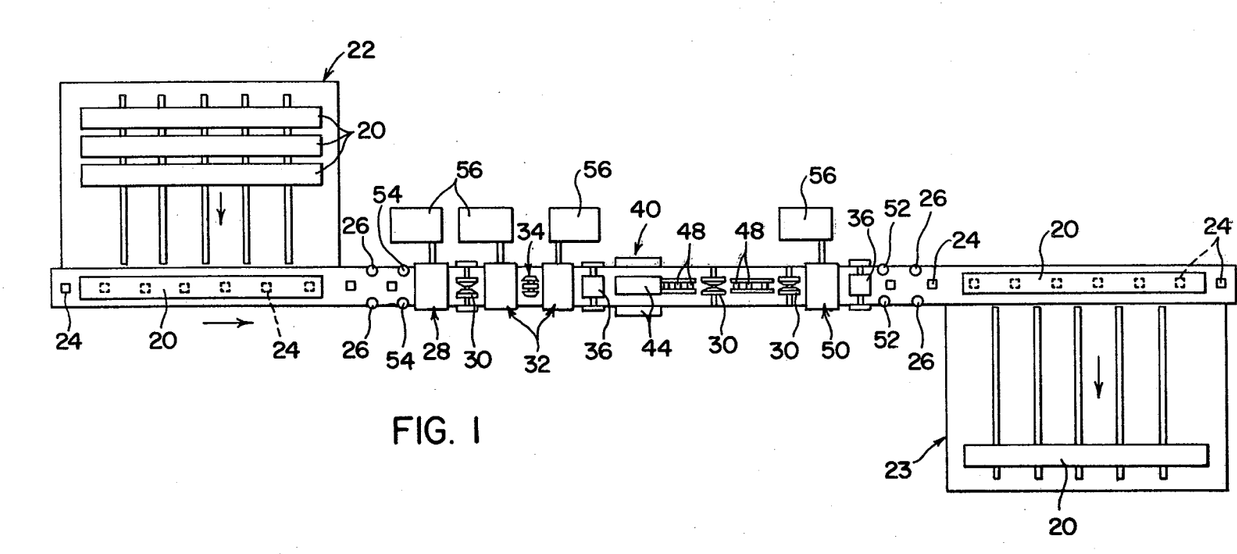
FIG. 1 is a schematic view of an entire production line for the induction heat treating, quenching and tempering of structural members in accordance with the method and apparatus of the present invention.

The apparatus portion of the present invention can be amply seen by reference to the figures of the drawings as follows. FIG. 1 generally shows an overall schematic of the heat treat line as presently contemplated for the treatment of carbon steel channel-shaped structural members numeral 20. Towards the left portion of FIG. 1, the entry table consists of any convenient means of stacking and presenting the structural members 20 in a sequential and singular fashion to the conveyor rolls 24 found at the lower edge of entry table 22 as seen in FIG. 1. As the structural members 20 are fed from the entry table 22 onto the conveyor rolls 24, the conveyor rolls 24, each roll stand being individually driven, will convey the structural members 20 to the point of entry into the vertical side guide rolls 26 as amply seen in FIG. 8 of the drawings. On entry end the vertical side guide rolls 26 are not adjusted tightly against the flanges of structural member 20 since alignment is more important. No working of the flanges occurs at the entry end.

Figure 8:
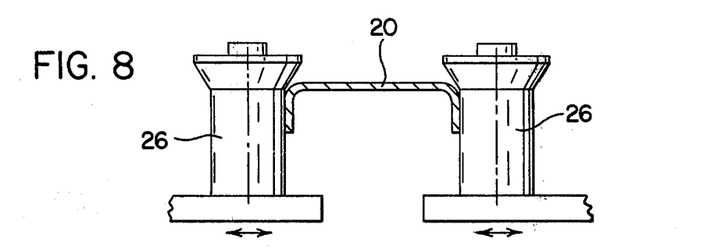
FIG. 8 is an end elevation view of vertical restraint and guide rolls.

Of course it is realized that those skilled in the art will amply be able to devise numerous alternatives to the feeding of the structural members 20 from an entry table to the point of entry that the vertical side guide and restraint rolls 26 as seen in FIG. 8. The combination of the vertical side guide and restraint rolls 26 and the last succeeding or first leaving conveyor rolls 24 are used on each end of the heat treat line so as to formulate a combination system of rolls similar to that seen in FIG. 9 which illustrates the final set of vertical side guide and restraint rolls 26 with conveyor roll 24. It should be noticed that the configuration of the vertical side guide and restraint rolls 26 is particularly suited to the containment of the structural member 20 in both horizontal and vertical alignment for entry and leaving from the heat treat line as seen in FIG. 1. The vertical side guide and restraint rolls 26 are adjusted on the exit end to provide adequate control of distortion and cambering of structural member 20.

It can also be noted from FIG. 1 that the direction of travel is indicated by the directional arrows seen from the entry table onto the line and in line from left to right as shown in FIG. 1 to the exit point onto the cooling table 23.

Figure 4:
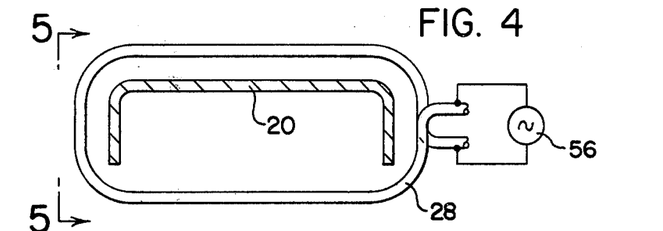
FIG. 4 is a cross-sectional view of the preheating induction coil showing the coil structure surrounding the structural member to be heat treated.

Returning to FIG. 1, at such time as the structural member 20 enters the vertical side guide and restraint rolls 26, the structural member 20 then commences its entry into the first of the heating stations which contains a preheating coil 28. Producing the heat for the preheat stage is an inductor producing power at a frequency in the range of 180 to 3000 cycles per minute. Such an inductor for preheating in this temperature range would utilize a frequency of 1000 cycles as the most preferred. The channel member 20 at this point, is preheated to a temperature in the range of 900° to 1400° F. It is in this temperature range that the inductor utilizing a frequency in the range of 180 to 3000 cycles would be the most efficient means of producing such temperatures. The shape of the preheat induction coil 28 can amply be seen in FIG. 4 wherein the coil is a simple oval envelope entirely encircling the structural member 20 to provide a heating source. Furthermore, looking at the preheat coil 28 from the side, shown in FIG. 5, it can be seen that it is a simple spiral wrap around the structural member 20.

Figure 12:
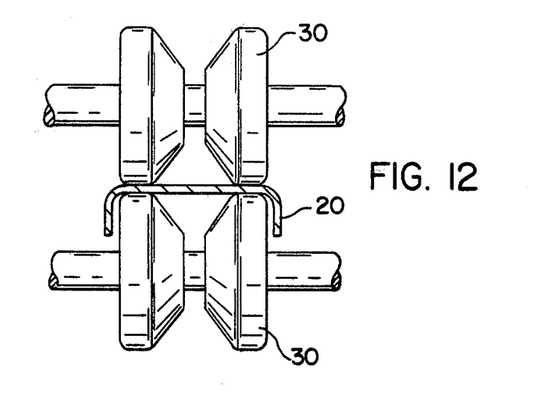
FIG. 12 is an end section view of primary pinch-restraint rolls.

As the structural member 20 exits the preheat coil 28, it encounters a first set of pinch rolls 30. The configuration of which can be seen in FIG. 12 of the drawings. It is this set of pinch rolls 30 that drives the structural member 20 to the next set of heat induction coils 32 while maintaining vertical restraint on structural member 20. The heat induction coils 32 consist of two heat induction coils 32 utilizing a frequency higher than that of the preheat coils 28. It is in this temperature range above the 900° to 1400° F. range at which a higher frequency is more energy efficient in terms of heating the structural member 20 to the much higher austenitizing temperature which is in the range of 1450° to 1800° F.

Figure 5:
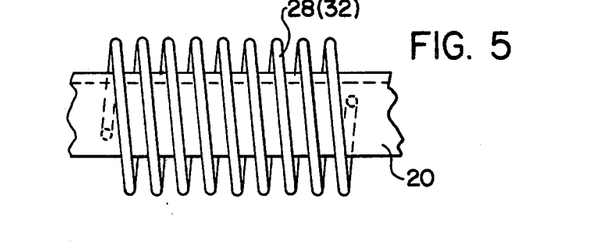
FIG. 5 is a side elevation view of the preheating induction coil taken along line 5—5 of FIG. 4.
Figure 6:
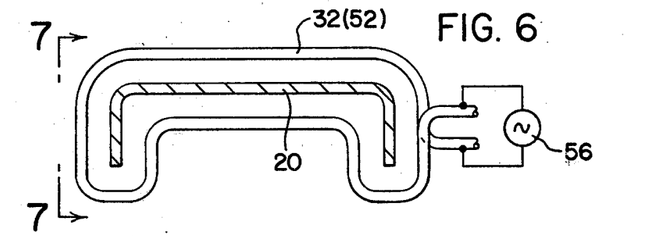
FIG. 6 is a cross-sectional view of the heating and tempering induction coils.

The most preferred frequency for the use of the heating coils is 10,000 cycles per minute and the heating coils 32 should have the configuration similar to that seen in FIG. 6 for the most efficient means of heating the structural member 20 as seen therein. Furthermore, the heat induction coils 32 would also have a spiral wrapping configuration as seen in FIG. 5 which is very similar to the preheat coil 28 in design. It should also be noted that the most preferred temperature for austenitizing of the structural member 20 is a temperature of 1750° F.

Figure 10:
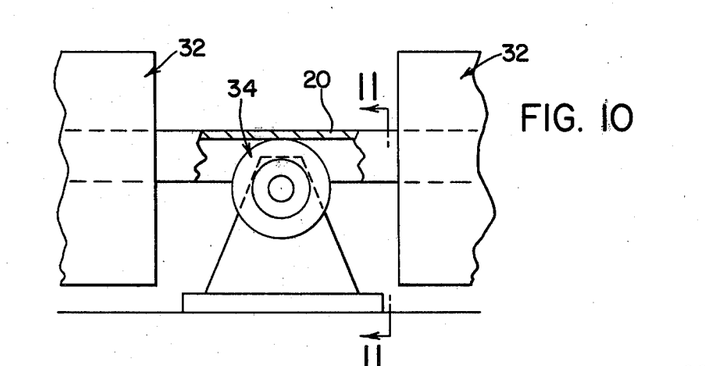
FIG. 10 is a partial cutaway side elevation view of the support rolls between induction coils.
Figure 11:
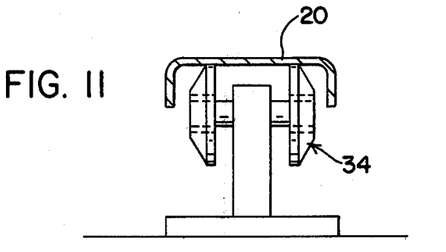
FIG. 11 is an end section view taken on 11—11 of FIG. 10.

It can be seen in FIG. 10 of the drawings, that between the two heat induction coils 32 there is a supporting roll assembly 34 which supports the structural member 20 in correct vertical alignment for entry into the second set of heat induction coils 32. As seen in FIG. 11 of the drawings, taken along line 11—11 of FIG. 10, the supporting roll assembly 34 utilizes a set of tapered rolls which is most preferred to provide the vertical support of the structural member 20 while maintaining ample spacial relationship between the flange portions of the structural member 20 and the supporting roll assembly 34.

Figure 13:
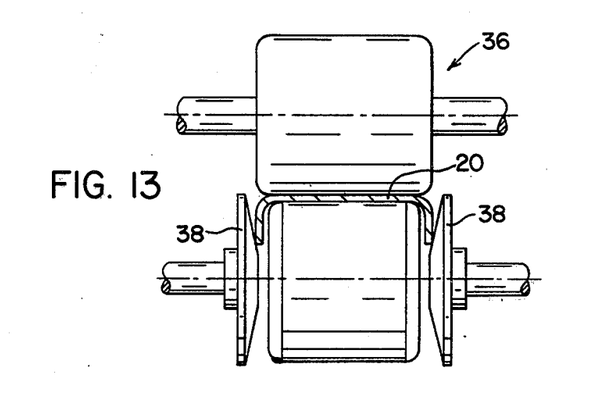
FIG. 13 is an end section view of primary pinch and flange hold rolls.

As the structural member 20 exits the second set of heat induction coils 32, it enters a second set of pinch-restraint rolls 36, the configuration of which can be amply seen in FIG. 13 of the drawings. As seen in FIG. 13, there is vertical support from above and below the structural member 20 along with flange restraint rolls 38 to prevent a spreading of the flanges of the structural member 20. It should be noticed that these side pinching rolls 38 are designed to apply a pressure to only the edge of the flanges of the structural member 20 which is designed to provide a finished product of the closest possible quality conformance specification for the structural member 20. As seen in FIG. 13, flange restraint rolls 38 are adjustable horizontally to accomodate structural members 20 of various sizes and these rolls 38 are adjustable vertically by use of shim packs to accomodate structural members 20 of various sizes. It is important to maintain the configuration of the structural member 20 at this point when the temperature of the structural member 20 hovers in the area of 1450° to 1800° F.

Figure 2:
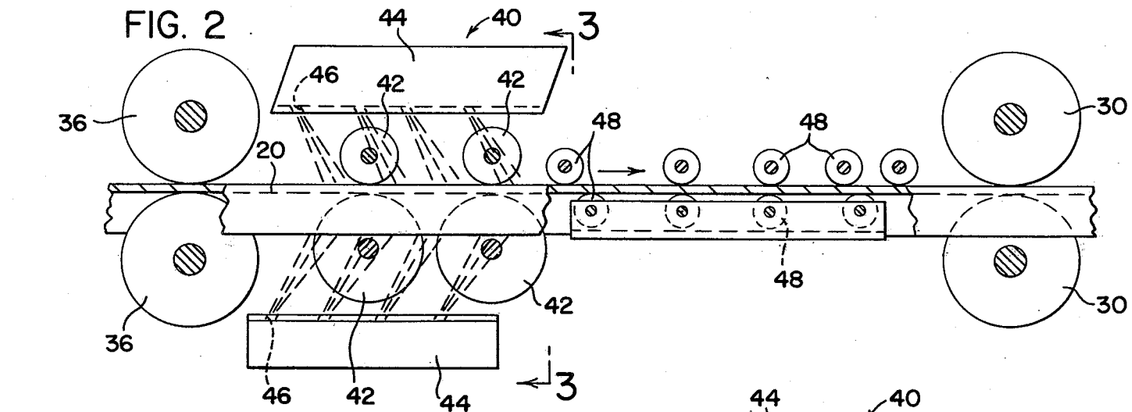
FIG. 2 is a side elevation view of the quench section of the improved apparatus.
Figure 3:
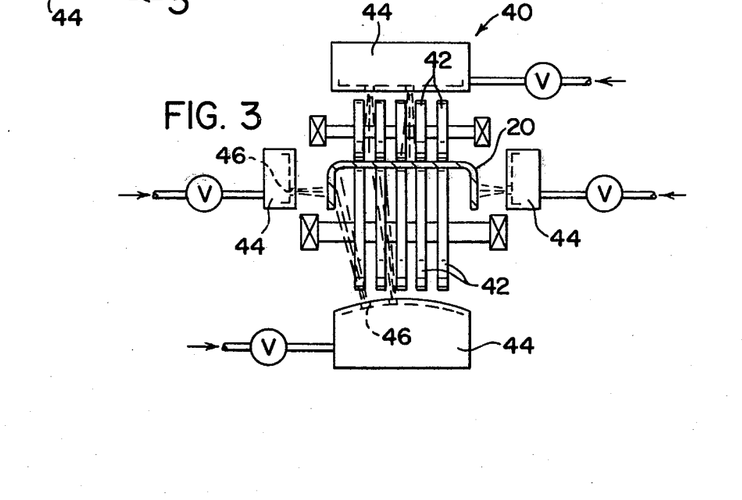
FIG. 3 is a longitudinal cross-section area along line 3—3 of FIG. 2.

The pinch-restraint rolls 36 drive the structural member 20 into the quench zone 40 as shown schematically in FIG. 1 and shown in more detail in FIGS. 2 and 3. Referring now to FIG. 2 which provides a larger view of the quench zone 40, it can be seen that the pinch-restraint rolls 36 force the structural member 20 into the quench zone 40 which contains a series of segmented quench rolls 42 which may be on both the top and bottom of the web portion of the sructural member 20 to maintain its configuration in the center of the quench while also permitting the multiplicity of liquid water supplies to impinge upon the structural member 20. A closer view of the structural member 20 inside of the quench zone 40, can be seen in FIG. 3 which is taken along line 3—3 from FIG. 2. FIG. 3 amply shows those skilled in the art how a segmented roll configuration can be used for segmented quench rolls 42 to achieve the results of tight configuration maintenance in the quench zone while allowing the quench operation to continue.

In this quench zone 40, it can be seen from FIG. 3 that the structural member 20 is surrounded on all sides by the multiplicity of liquid supplies 44 which through a series of apertures 46 will supply an ample amount of liquid to quickly reduce the temperature of the structural member to a temperature in the range of 750° to 1200° F. These apertures in the present invention are approximately $\frac{1}{8}$ of an inch in diameter and are angled in the direction of advancement of the structural member 20 so as to impinge upon all surfaces of the structural member 20 to achieve an even and quick cooling of the structural member 20 to a temperature in the most preferred range of 1000° to 1100° F. As would be obvious to those skilled in the art, the amount of liquid, water being the preferred liquid, would be governed by the speed with which the structural member is being passed through the treatment line and the mass of member 20. Generally speaking, a gallon per minute flow rate in the range of 500 to 1000 gallons per minute is the most preferred. The criteria for the level of flow of liquid for the quenching of the structural member 20 should be governed by that amount of flow which will allow the rapid and even quenching of the structural member 20 to the given temperatures as stated above while not transferring so much heat to the quenching liquid as to cause the quenching liquid to vaporize.

The angle of impingement of the quench liquid upon the structural member 20 is important with regard to the aspects of a quick quenching or lowering of the temperature of the structural member 20 while also minimizing the contact time with the quench liquid and the structural member 20 so as to eliminate the vaporization or boiling of the quenched liquid upon contact with the structural member 20. This, in addition to the volume of quench liquid flow, prevents any vaporization which can cause problems with regard to maintenance of the equipment and moisture problems and most importantly, uneven transformation to martensite crystal structure due to hot spots created by the vaporization presenting adequate flow of the quench medium to reach the structural member 20 surface. The angle of impingement upon the structural member 20 as amply seen in FIG. 2 of the drawings is always angled in the direction of travel of the structural member 20 through the quench zone 40 at an angle in the range of 15° to 60°. Angling in the direction of travel prevents uneven flow of the quench medium and helps to keep it out of the heating coils 32 which would cause damage to the equipment. The angle of attack of the quench liquid from the apertures 46 in the quench zone 40 is at an angle which is sufficiently high to assure the quenching contact with the structural member 20 while being sufficiently under 90° as to cause the quench liquid to rapidly disburse on the surface of the structural member 20 and be driven off of the structural member before achieving a temperature near its vaporization or boiling point, a 30° angle being the most preferred angle.

As can be amply seen in FIGS. 2 and 3, the structural member is restrained within the quench zone 40 by a set of horizontally displaced segmented quench rolls 42 which assist in maintaining the distortion of the structural member 20 to a minimum while allowing the quench liquid to be sprayed on the structural member 20 from the apertures 46 in the quench zone 40.

As can be amply seen in FIG. 2 of the drawings, additionally at the exit end of the quench zone 40, it has been found to be necessary to add a set of guide rolls 48 to assure that the member progresses evenly and steadily to the pinch rolls 30 which next drive the structural member 20 to the next set of pinch rolls 30 to prepare the material for the next stage of processing. Rolls 42 and 48 need not be as substantial as rolls 36 or 30 since the restraining force is transferred back into the hot plastic region of the structural member 20 following roll 36.

Next follows the tempering section 50 in which the temperature of the structural member 20 is again raised to a temperature in the range of 750° to 1200° F., with the most preferred temperature range being 1000° to 1100° F. This is accomplished through the use of a induction coil which utilizes a frequency in the range of 180 to 3000 cycles per minute to heat the channel member 20. The most preferred frequency for energy efficiency in this heat tempering process is an inductor coil utilizing a frequency of 1000 cycles per second. It should be noted that the inductor coil utilized for the temper section 50 of the processing equipment, is a coil of the configuration of heat inductor coil 32 as best seen in FIG. 6 of the drawings which closely approximates the configuration of the structural member 20 which is being tempered.

Figure 7:
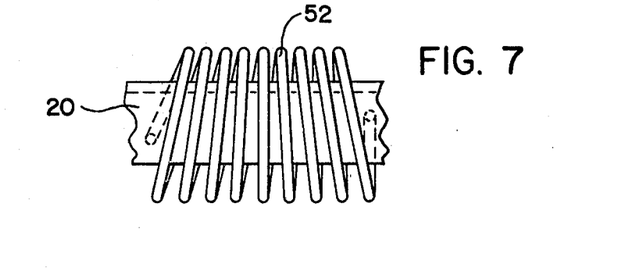
FIG. 7 is a side elevation view of the tempering induction coil.

Furthermore, it is important to note that even temperature control is important in the temper section 50 and thus, in accordance with FIG. 7 of the drawings, the coil 52 as seen from a lateral view has been spread somewhat reducing the power density at the structural member 20 flange edges thus reducing the temperature achieved on the flanges of the structural member 20 so as to provide a very even heat content throughout the material content of structural member 20 as it passes through the temper section 50. Immediately following the temper section 50 is another set of drive pinch rolls 36 in accordance with FIG. 13 of the drawings in which both the web is used for driving the structural member 20 through the pinch rolls and additionally the flange edges are maintained in tight conformity to assure that the structural member 20 maintained its proper configuration while cooling to a normal temperature.

Figure 9:
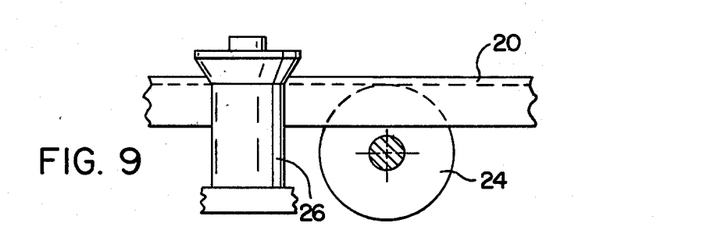
FIG. 9 is a partial side elevation view of the vertical restraint and guide rolls found at the end of the heat treat line.

Following the drive pinch rolls 36 are further sets of vertical restraint rolls 54 which can be amply seen in FIG. 14 of the drawings as again restraining the flange members of the structural member 20 so as to assure the true configuration of the structural member 20 through the final stage of processing. The final set of rolls utilized in the processing stage are the exact mirror image of the very first set of rolls used in the processing stage as best seen in FIGS. 8 and 9 of the drawings except that they are adjusted for tighter control. These vertical guide and restraint rolls 26 and 54, along with side pinching rolls 38 of pinch roll 36, work together against the member 20 to provide additional control of camber, such at pre-punched holes subsequent to the heat treat operation are within acceptable tolerance ranges.

Finally, the structural member is conveyed to the ends of the conveyor rolls 24 and then moved laterally onto the cooling tables 23 as best seen in FIG. 1 of the drawings.

Each of the induction heating coils 28, 32 and 52 are fitted with an alternating current through a generation system which will produce varying frequencies in the instant case particularly 1000 and 10,000 cycle frequencies. These heat stations 56 are individualized so as to feed each one of the heating induction coils 28, 32 and 52 with the required power of alternating current to produce the most energy efficient means of heating the structural member 20 to the desired temperature ranges. Input power to the heat station as is known to those skilled in the art, may be provided by motor-generator sets or solid state SCR drivers.

The prior art methods of induction heat treating encounter particular problems in connection to the quenching and tempering of channel members 20 as seen in the drawings in that they have a tendency to bow, camber and twist in addition to growth along the length and width of such members. These conditions greatly inhibit the ability to provide mounting apparatus in the channel members 20 in such a quality controlled condition as to allow high production volume of the member which will meet the quality specifications as established by the user of the material. It is highly desirable for instance, to take a flat sheet of material and cold form it into the channel configuration of structural member 20, transfer the structural member 20 to a punching operation to establish the apertures as required by the user to within close tolerances, and then to heat treat the structural member to increase its physical properties while maintaining the close tolerances necessary to meet the user's specification for the placement of the apertures in the structural member 20. This has been very difficult particularly since the strains due to cold working of the structural member 20 manifest themselves as residual stresses in the formed part, which are then relaxed in the thermal cycle of the heat treating process. The strains resulting from rapid heating and quenching of a structural member 20 of non-symmetrical cross-section act to cause distortions which in turn cause the structural member 20 to exhibit the bow, twist and cambering in addition to some stretching of the material.

To assist in minimizing some of these problems of the prior art, the apparatus of the present invention as amply seen in FIG. 1 of the drawings, includes the use of the dual set of vertical restraint rolls in the form of vertical rolls 54 and vertical guide and restraint rolls 26 after the temper section to assist in minimizing the cambering of the material which causes the apertures punched in the structural member 20 to go off location in a side-to-side condition by as much as ¼ of an inch in the prior art methods and apparatus. It has been found to be of particular import that the edge of the flange of the structural member 20 can be best utilized for the obtainment of this correct positioning of the configuration of the structural member 20 to minimize the cambering which normally occurs in a tempering process.

Figure 14:
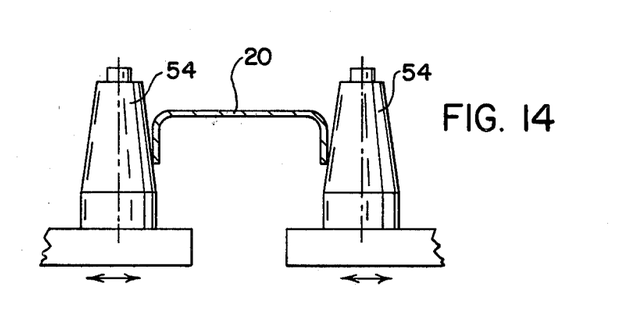
FIG. 14 is an end section view of the vertical restraint rolls.

It should be noted as seen in FIG. 14 of the drawings, that the vertical restraint rolls 54 have a frusto conical shape to hold in tight configuration the flange portions of the structural member 20 which then proceeds to the last set of vertical guide and restraint rolls 26 at the end of the line. Furthermore, it has been found that vertical restraint rolls 54 can be cylindrical in shape to perform their function. This assures a minimum amount of cambering resulting from the tempering of this material so as to maximize the ability to produce apertures in the structural members 20 in very close tolerances on a high speed production basis. It has been found that particularly the use of these two vertical restraining systems of rolls immediately following the pinch restraint rolls 36 has achieved a very high level of quality conformance of the production of such structural members 20 to specifications of the user.

Another grave problem of the prior art methods and apparatus presented for heat induction treating of structural members 20 has been the sinusoidal bowing of the structural member 20 and more particularly a localized bowing of the structural member 20 which tends to occur in the first 72 inches of the structural member 20 passing through the heat treating system. It has been found that this localized bowing or sinusoidal bowing in the first portions of the structural member passing through the system can be virtually eliminated by the use of restraints within the quench as opposed to the prior art methods of restraining subsequent to the quench. This can be amply seen in FIG. 3 of the drawings wherein quench zone 40 has been provided with a series of segmented quench rolls 42 which allow the quench zone to perform its functions of quenching the material while maintaining in tight conformity the vertical alignment of the structural member 20 which is being quenched.

The pressure of the liquid flow is also important to minimize deflection of the structural member 20. It has been found that a pressure from the bottom in the range of 10 to 20 pounds per square inch as related to a pressure from the top in the range of 1.5 to 6 pounds per square inch is most preferred in terms of quality conformance on a production speed basis. As would be obvious to those skilled in the art, changes in steel chemistry, size and configuration of the structural member 20 greatly impact upon the operation parameters used. Also speed of advance of the structural member 20 through the heat treat system influences the exact operating conditions.

Thus it should be apparent from the foregoing description of the preferred embodiment and the method herein described and shown accomplishes the objects of the invention and solves the problems attendant to the prior art methods and apparatus for heat treating of structural members while substantially reducing the energy expenditure in such process and achieving high quality conformity on a production basis such structural members which are needed in large quantities for user construction of structural assemblies.

What is claimed is:

1. A method for induction heat treating and quenching of a structural member of carbon steel to a uniform martensitic structure, said structural member having a web and at least one flange substantially perpendicular thereto consisting of induction preheating the structural member to a temperature in the range of 900° to 1400° F. by means of at least one coil utilizing the frequency in the range of 180 to 3000 cycles;

continuting in a separate induction heating stage to heat the structural member to the austenitizing temperature in the range of 1450° to 1800° F. by the use of at least one coil having a higher frequency than that of the prior step;

liquid quenching the structural member with a multiplicity of nozzles immediately, said nozzles being disposed at an angle in the direction of the advance of the structural member and the pressure regulated from the bottom of the quench zone liquid quench within the range of 10 to 20 pounds per square inch, from the top of the quench zone liquid quench in the range of 1.5 to 6 pounds per square inch and from the sides of the quench zone liquid quench in the range of 5 to 25 pounds per square inch of the structural member to minimize distortion thereof;

concurrently restraining the member by its web in a series of segmented restraining rolls placed on the bottom and the top thereof so as to present slots through which the liquid may be sprayed to quench the structural member until the structural member has reached a temperature below 1000° F. to minimize localized bow distortion;

induction heating the structural member to a temperatering temperature in the range of 750° to 1250° F. by the use of a coil having a frequency in the range of 180 to 3000 cycles; and subsequently restraining the structural member while cooling to avoid camber distortion by passing the structural member through web restraining and tapered roll flange forming rolls, followed by tapered vertical restraint rolls, and finally flange surface engaging rolls to minimize cambering distortion.

2. The method of claim 1, in which the structural member is a channel.

3. The method of claim 1, in which the structural member is a truck side rail.

4. The method of claim 1, in which the carbon steel has the following composition: carbon 0.21–30%, manganese 1.00 to 1.35%, sulfur 0.05 max., phosphorous 0.04 max., with minimum physical properties after heat treating of yield strength 110,000 psi and tensile strength 125,000 psi.

5. The method of claim 1, in which the carbon steel is an approximate SAE 1025-modified or 1027 with greater amount of manganese approximately 1.00 to 1.50%.

6. The method of claim 1, in which the hardness after tempering reaches 269 to 331 Brinell.

7. The method of claim 1, in which preheating is done with induction heating at a frequency of 3,000 cycles or less.

8. The method of claim 7, in which the preheating is done with induction preheating at a frequency of 180 cycles or more.

9. The method of claim 1, in which the heating to austenitizing temperature is done at a frequency of 10,000 cycles.

10. The method of claim 1, in which the induction tempering is done at 3,000 cycles or less.

11. The method of claim 1, in which all of the induction heating and induction tempering is done by induction heating in a shaped coil that approximates the structure of the part in question.

12. The method of claim 1, in which the preheat induction coil is an oval coil.

13. The method of claim 1, in which the structural member is a truck side rail having portions of the flange removed at points of lower stress and the heating steps are by induction heating with the amount of current passing through any section being in proportion to the cross section of metal in said section in order to avoid localized overheating in the thinner sections of metal where the flanges have been removed.

14. The method of claim 13, in which the speed of the structural member with respect to the induction preheating limits the overheating of the member.

15. The method of claim 1, wherein the concurrent restraining elements in the liquid quench restrain the web of the structural member to minimize the bow distortion of the structural member.

16. The method of claim 1, wherein the tempering temperature is in the preferred range of 1000° to 1100° F.

17. The method of claim 1 wherein the angle of impingement of the liquid quench is in the range of 15° to 60° measured on the side of impingement from which the structural member advances.

18. The method of claim 17, wherein the angle is 30°.

19. The method of claim 1, wherein the rate of liquid flow in the liquid quench is in the range of 500 to 1000 gallons per minute.

20. The method of claim 1, wherein the liquid quench uses water as the quench medium.

21. The method of claim 1 wherein the point of impingement of the liquid quench is carefully controlled to impact upon the structural member at properly related points longitudinally of the structural member to control distortion.

22. The method of claim 1 wherein the drawing force and downward pressure of the upper pinch rolls after heating the structural member is controlled to affect and control growth of the structural member width.

* * * * *